C. GRANSTON.
RADIATOR SHIELD.
APPLICATION FILED MAR. 30, 1916.
1,218,547.
Patented Mar. 6, 1917.
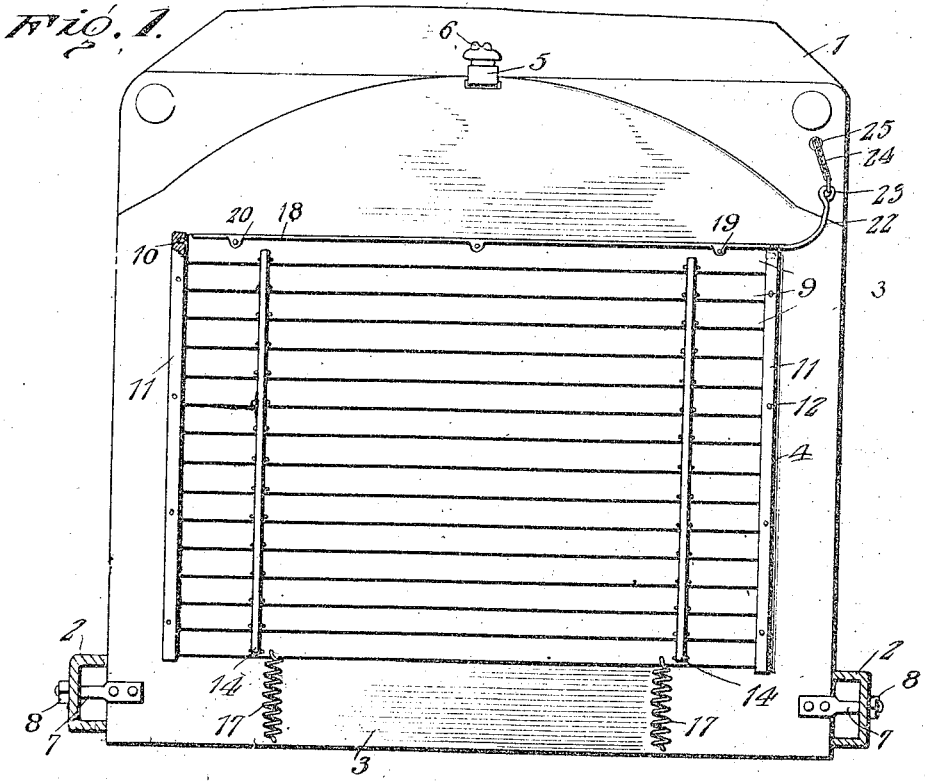
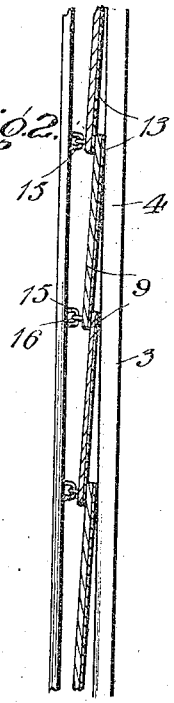
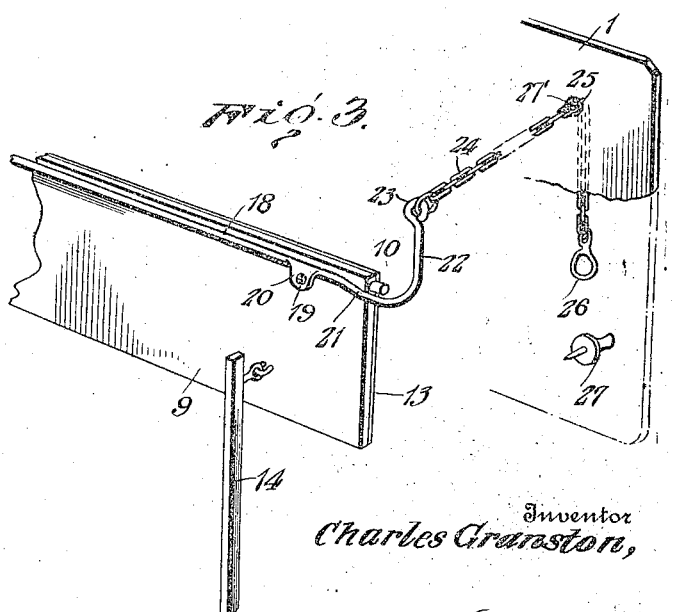
Inventor
Charles Granston,
By Geo. P. Kimmel.
Attorney

UNITED STATES PATENT OFFICE.

CHARLES GRANSTON, OF WATKINS, NEW YORK.

RADIATOR-SHIELD.

1,218,547.  Specification of Letters Patent.  Patented Mar. 6, 1917.

Application filed March 30, 1916. Serial No. 87,841.

*To all whom it may concern:*

Be it known that I, CHARLES GRANSTON, a citizen of the United States, residing at Watkins, in the county of Schuyler and State of New York, have invented certain new and useful Improvements in Radiator-Shields, of which the following is a specification.

The present invention relates to automobile radiators and has particular reference to new and useful improvements in shields therefor.

The primary object of my invention is to provide in a radiator shield a structure permitting the opening and closing of the shield as desired, whereby to admit or exclude the surrounding atmosphere to or from the radiator of an automobile.

Another object of my invention is to provide a shield of the class described adapted to be operated from the dash of the automobile, means being provided for maintaining the shield open and means also being provided for normally maintaining the shield in closed position.

A further object of my invention is to provide a shield of the class described which is detachable from an automobile radiator and sold as a separate article whereby automobile users may apply the device to their machines regardless of the type of automobile.

Other objects and advantages to be derived from the use of my improved radiator shield will appear from the following detail description and the claims, taken with an inspection of the accompanying drawing, in which—

Figure 1 is a front elevation of an automobile showing my improved shield applied thereto, Fig. 2 is an enlarged fragmentary vertical sectional view taken through the sections of the shield, and Fig. 3 is an enlarged perspective view of one of the sections of the shield and the operating mechanism therefor.

Referring more particularly to the drawing, wherein similar characters of reference designate like and corresponding parts throughout the various views, 1 designates the dash of an automobile, and 2 the side beams of the chassis.

My improved shield includes a sheet metal body 3 having an opening 4 therein preferably rectangular in configuration, said opening being normally closed by means hereinafter set forth in detail. The body 3 is supported on the front end of the engine hood of an automobile by means of a strap 5 engaging around the filler cap 6 of the radiator and by means of bolts 7 extending through the side members 2 and secured in position by means of nuts 8.

The opening 4 in the body 3 is closed by means of a plurality of shutter sections 9 hinged on trunnions 10 carried adjacent their upper marginal edges and secured in position by means of bearing strips 11 bolted or otherwise secured to the body 3 as at 12. The sections 9 are preferably in overlapping relation as best shown in Fig. 2, and the inner surfaces of the sections are coated with a fire-proof material or lined with asbestos, said coating or lining being designated 13.

I provide means for simultaneously opening and closing the sections 9, said means comprising a plurality of bars 14 having loops 15 in spaced relation thereon, said loops being engageable by complementally engaged loops carried by the sections 9. A pair of coil springs 17 having their free ends attached to the lowermost of the sections 9 and to the body 1, as best shown in Fig. 1, serve to maintain the sections normally in closed position. In order to open the sections the uppermost section is provided with a rod 18 secured thereto by means of screws 19 passing through lugs 20 formed on said rod, one free end of said rod being offset as at 21 to avoid the upper end of one of the strips 11, said offset terminating in an upturned arm 22 having a loop 23 engaged by a chain 24 passing through an opening 25 in the dash 1, the said chain having a ring 26 on the free end thereof engageable with a stud 27 mounted on the dash. A lug 27' is mounted on the dash 1 adjacent the opening 25 to engage the links of the chain 24, whereby to adjust the chain and hence adjust the degree to which the shield is open.

In operation, assuming that it is desired to admit air to the radiator, the ring 26 is drawn down until it engages with the stud 27. This opens all of the sections 9, the movement of the uppermost section being imparted to the other sections by means of the bars 14. It will be seen that the shield itself may be readily applied to any of the existing types of automobiles, with the exception of these types of automobiles having divergent front walls composing the radiator. Of course my invention may be modified in shape to conform to such type of radiators.

From the above description taken in connection with the accompanying drawing, it is thought that a clear and comprehensive understanding of the construction, operation and advantages of my invention may be had, and while I have shown and described my invention as embodying a specific structure, I desire that it be understood that I may make such changes on said structure as do not depart from the spirit and scope of the invention as claimed.

What I claim as new and desire to secure by Letters-Patent is:—

1. In a radiator shield, a body having an opening therein, a plurality of bearing strips, a closure for said opening comprising a plurality of sections hingedly mounted in said strips and adapted to lie in overlapping relation when in closed position, a rod, lugs formed on said rod for attaching the same to the uppermost section, manipulating means associated with said rod, means connecting all of said sections, spring means for returning the sections to closed position when opened by said manipulating means, and means for fastening said body in front of an automobile radiator.

2. The combination of an automobile chassis having openings in the front end thereof, of a radiator shield comprising, a body having an opening therein, a plurality of bearing strips, a closure for said opening comprising a plurality of sections hingedly mounted in said strips and adapted to lie in overlapping relation when in closed position, a rod, lugs formed on said rod for attaching the same to the uppermost section, the free end of said rod being offset to avoid the upper end of one of the bearing strips, a loop formed on the end of said offset portion, manipulating means associated with said loop, means for attaching said body to the automobile radiator comprising, a pair of oppositely extending bolts adapted to engage the openings in said chassis, and a strap member formed on the upper ends thereof adapted to engage the filler cap of the radiator, spring means for returning the sections to closed position when opened by said manipulating means.

In testimony whereof I affix my signature hereto.

CHARLES GRANSTON.